(12) United States Patent
McGarry et al.

(10) Patent No.: US 8,239,076 B2
(45) Date of Patent: Aug. 7, 2012

(54) VEHICLE SLOWDOWN CONTROL VIA SHORT RANGE WIRELESS COMMUNICATION

(75) Inventors: Daniel C. McGarry, Oxford, MI (US); Dmitri Jdanov, Ontario (CA); Bradley J. Burgess, Fenton, MI (US); Christopher L. Oesterling, Troy, MI (US); Sam S. Chang, West Bloomfield, MI (US); Richard F. Heines, Ortonville, MI (US)

(73) Assignee: General Motors LLC, Detroit, MI (US)

( * ) Notice: Subject to any disclaimer, the term of this patent is extended or adjusted under 35 U.S.C. 154(b) by 1102 days.

(21) Appl. No.: 12/059,893

(22) Filed: Mar. 31, 2008

(65) Prior Publication Data

US 2009/0248222 A1     Oct. 1, 2009

(51) Int. Cl.
*B60Q 1/00* (2006.01)
*B60R 25/04* (2006.01)
*G08G 1/017* (2006.01)

(52) U.S. Cl. ............. 701/2; 700/36; 700/93; 340/425.5; 340/5.2

(58) Field of Classification Search ............. 701/2, 35, 701/36, 93, 96; 340/425.5, 5.2, 426, 5.5, 340/825.09, 5.61; 455/3.02, 12.1
See application file for complete search history.

(56) References Cited

U.S. PATENT DOCUMENTS

| 5,513,244 | A | * | 4/1996 | Joao et al. ................ 455/404.1 |
| 5,861,799 | A | * | 1/1999 | Szwed ...................... 340/425.5 |
| 5,963,129 | A | * | 10/1999 | Warner ........................ 340/468 |
| 6,411,887 | B1 |  | 6/2002 | Martens et al. |
| 6,611,201 | B1 |  | 8/2003 | Bishop |
| 6,873,246 | B1 |  | 3/2005 | Ligoci, Sr. et al. |
| 7,015,792 | B2 | * | 3/2006 | Lessard et al. ............... 340/5.61 |
| 7,049,709 | B2 | * | 5/2006 | Boggs ......................... 307/10.2 |
| 7,305,294 | B2 | * | 12/2007 | Bate et al. ....................... 701/93 |
| 7,346,439 | B2 |  | 3/2008 | Bodin |
| 7,907,976 | B2 | * | 3/2011 | Himmelstein ............. 455/569.2 |
| 7,999,654 | B2 | * | 8/2011 | Taki et al. ..................... 340/5.64 |
| 2002/0067248 | A1 | * | 6/2002 | Howells ........................ 340/426 |
| 2006/0250272 | A1 | * | 11/2006 | Puamau ................... 340/825.69 |
| 2007/0288127 | A1 | * | 12/2007 | Haq et al. .......................... 701/2 |

FOREIGN PATENT DOCUMENTS

| JP | 2006-3957 A | 1/2006 |
| WO | WO9830421 | 7/1998 |
| WO | WO99/60542 A1 | 11/1999 |

OTHER PUBLICATIONS

Chinese Office Action for Patent Application No. 200910132505.2, corresponding to U.S. Appl. No. 12/059,893, Apr. 6, 2011, 8 pages.
German Office Action for German Patent Application No. 10 2009 015 055.2, corresponding to U.S. Appl. No. 12/059,893, Oct. 7, 2009, 16 pages.

* cited by examiner

*Primary Examiner* — Tan Q Nguyen
(74) *Attorney, Agent, or Firm* — Anthony L. Simon; Reising Ethington P.C.

(57) ABSTRACT

A method and system for enabling police pursuing a vehicle to slow the vehicle down via short range wireless communication with the vehicle. The process can be carried out with or without involvement of a call center that provides telematics services to the vehicle. The method involves configuring the vehicle to accept a slowdown command, confirming the target vehicle at a pursuing police vehicle, establishing the short range connection between the police vehicle and target vehicle, and slowing the target vehicle by sending it the slowdown command over the wireless connection. The call center can enable or disable the slowdown service according to the vehicle owner's wishes.

17 Claims, 4 Drawing Sheets

VEHICLE SLOWDOWN CONTROL VIA SHORT RANGE WIRELESS COMMUNICATION

TECHNICAL FIELD

The present invention relates generally to vehicle telematics systems and, more particularly, to techniques for remotely controlling vehicles to slow them down to a stop during police pursuit.

BACKGROUND

Currently produced vehicles often come equipped with OEM-installed telematics units that include wireless cellular telephony hardware that enables the telematics unit to connect with a call center and be used by the vehicle operator to carry out voice telephone calls through the telematics unit without the need for a separate mobile handset. These telematics units are integrated into the vehicle electronics such that they can send and receive data and commands to and from various other vehicle systems. As is relevant to stolen vehicle recovery and police chases of drivers evading capture, it is known to provide vehicles having these telematics units with the ability to cause the vehicle to slow down to a stop in response to a command sent to the vehicle from a call center. The process typically involves the police identifying the target vehicle, contacting the call center to request slowdown assistance, confirming the target vehicle with the call center, and then transmission by the call center of a slowdown command to the vehicle at a point in time specified by an officer in a pursuing police vehicle.

A benefit of this prior approach is that it permits the pursuing officer to specify the timing of the slowdown so that it can be done at a safe, appropriate point in time. However, the actual command to the target vehicle is issued by the call center, not the officer, so that to effect the slowdown, the officer must transmit the slowdown request to the call center which then issues the command to the vehicle. Furthermore, communication between the pursuing officer and call center may be by way of a dispatcher or PSAP such that the request must be relayed to the call center.

SUMMARY OF THE INVENTION

According to an aspect of the invention, there is provided a method of controlling a vehicle during police pursuit of the vehicle, comprising the steps of (a) identifying a target vehicle at a police vehicle in pursuit of the target vehicle; (b) configuring the target vehicle to accept a slowdown command; (c) confirming the target vehicle at the police vehicle; (d) establishing a short range wireless connection between the police vehicle and target vehicle; and (e) slowing the target vehicle by sending it the slowdown command from the police vehicle over the short range wireless connection.

In accordance with another aspect of the invention, there is provided a system for controlling a vehicle during police pursuit of the vehicle. The system includes a target vehicle and police vehicle, each being configured to communicate with the other via short range wireless communication. For this purpose, the target vehicle has a wireless communication device that is programmed with executable code that (1) permits a short range wireless connection to the vehicle, (2) enables the target vehicle to confirm establishment of a short range wireless connection to the vehicle, and (3) enables slowing of the target vehicle in response to receiving a slowdown command via the short range wireless connection. The police vehicle also has a wireless communication device that is programmed with executable code that (1) enables establishment of the short range wireless connection to the target vehicle, (2) confirms the target vehicle via the short range wireless connection, and (3) enables an occupant of the police vehicle to initiate transmission of the slowdown command from the police vehicle to the target vehicle over the short range wireless connection.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

Figure 2:
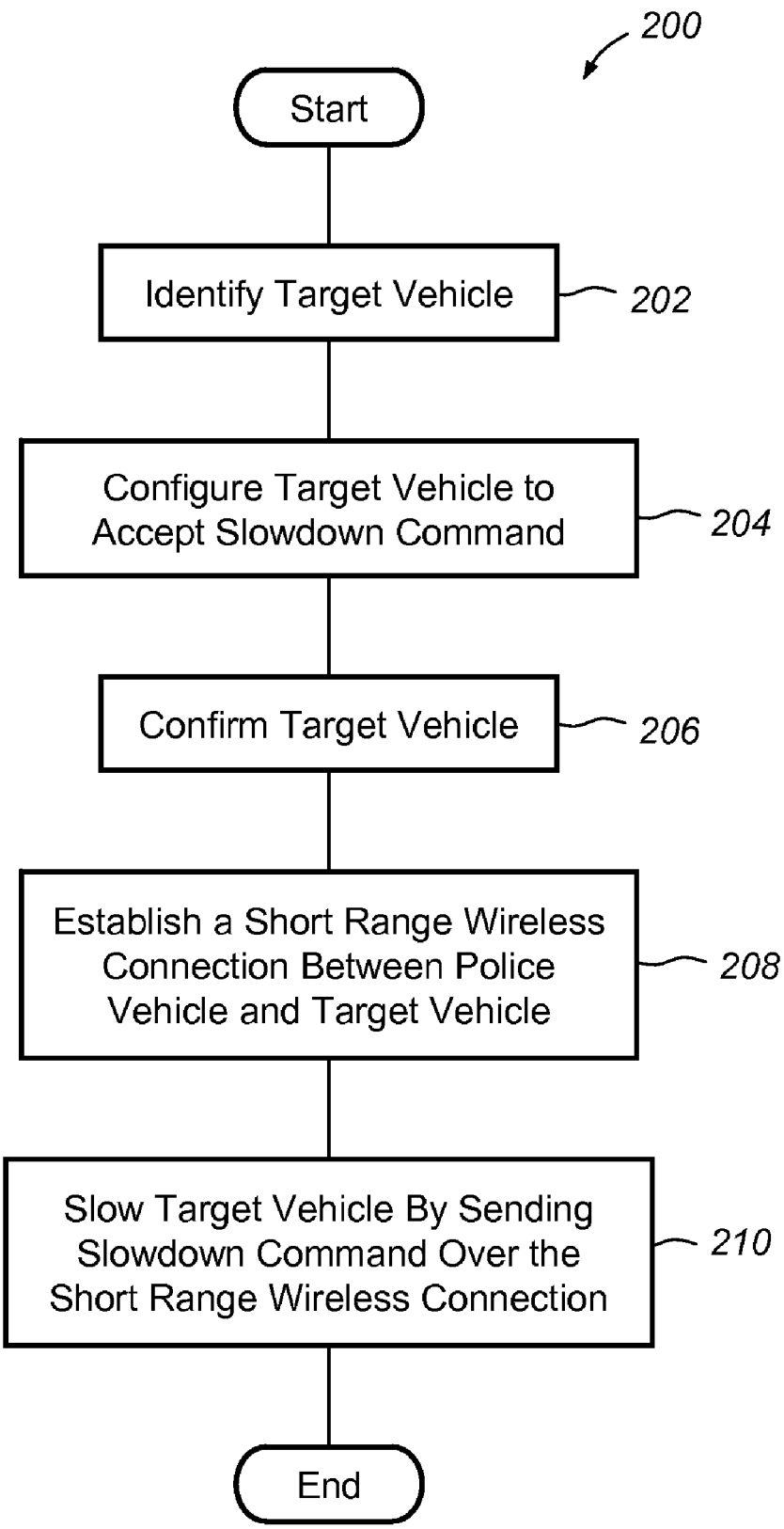
FIG. 2 is a flowchart depicting a method of controlling a vehicle during police pursuit of the vehicle.
Figure 3:
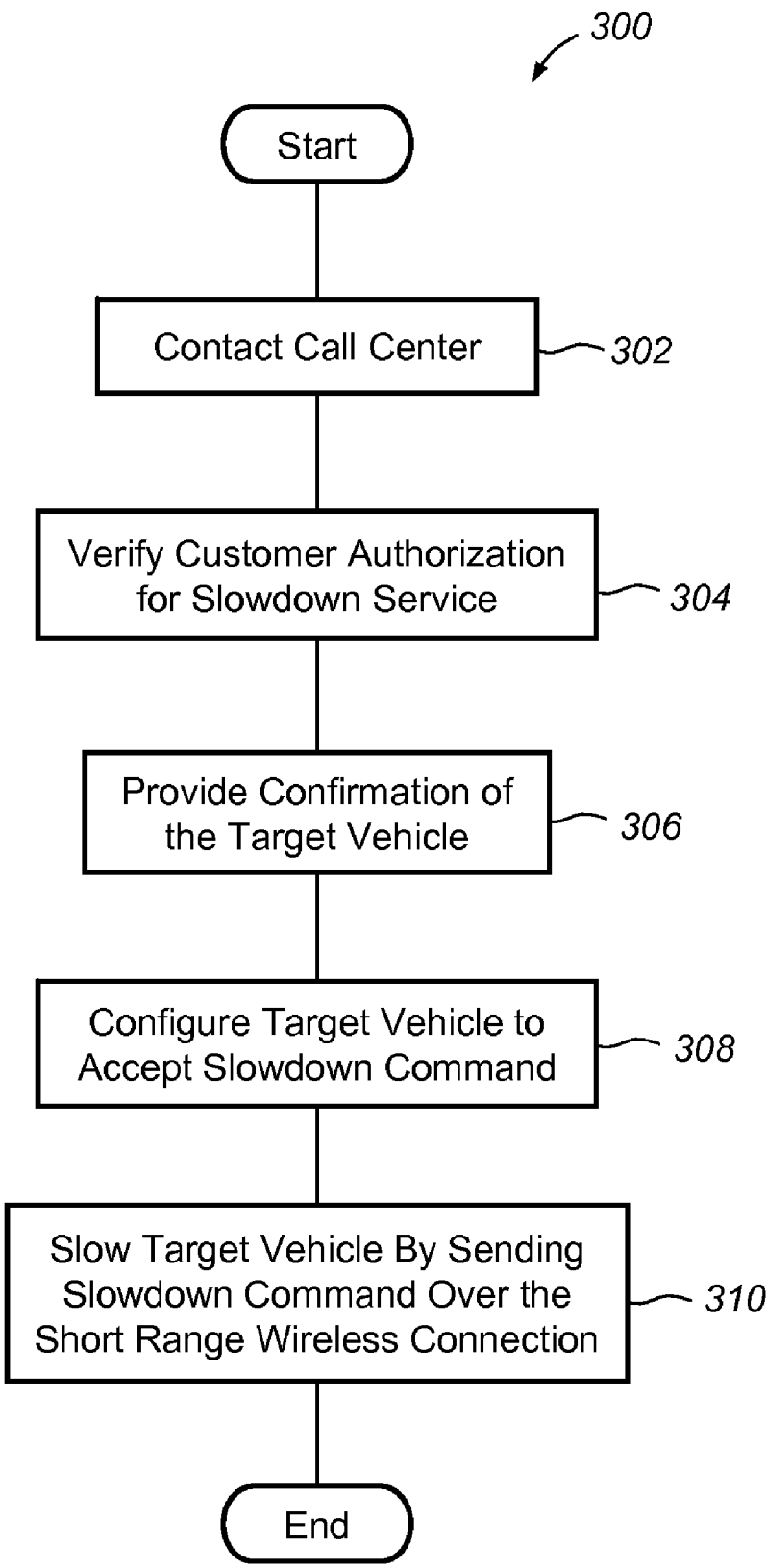
FIG. 3 is a flowchart showing one embodiment of the method of FIG. 1.
Figure 4:
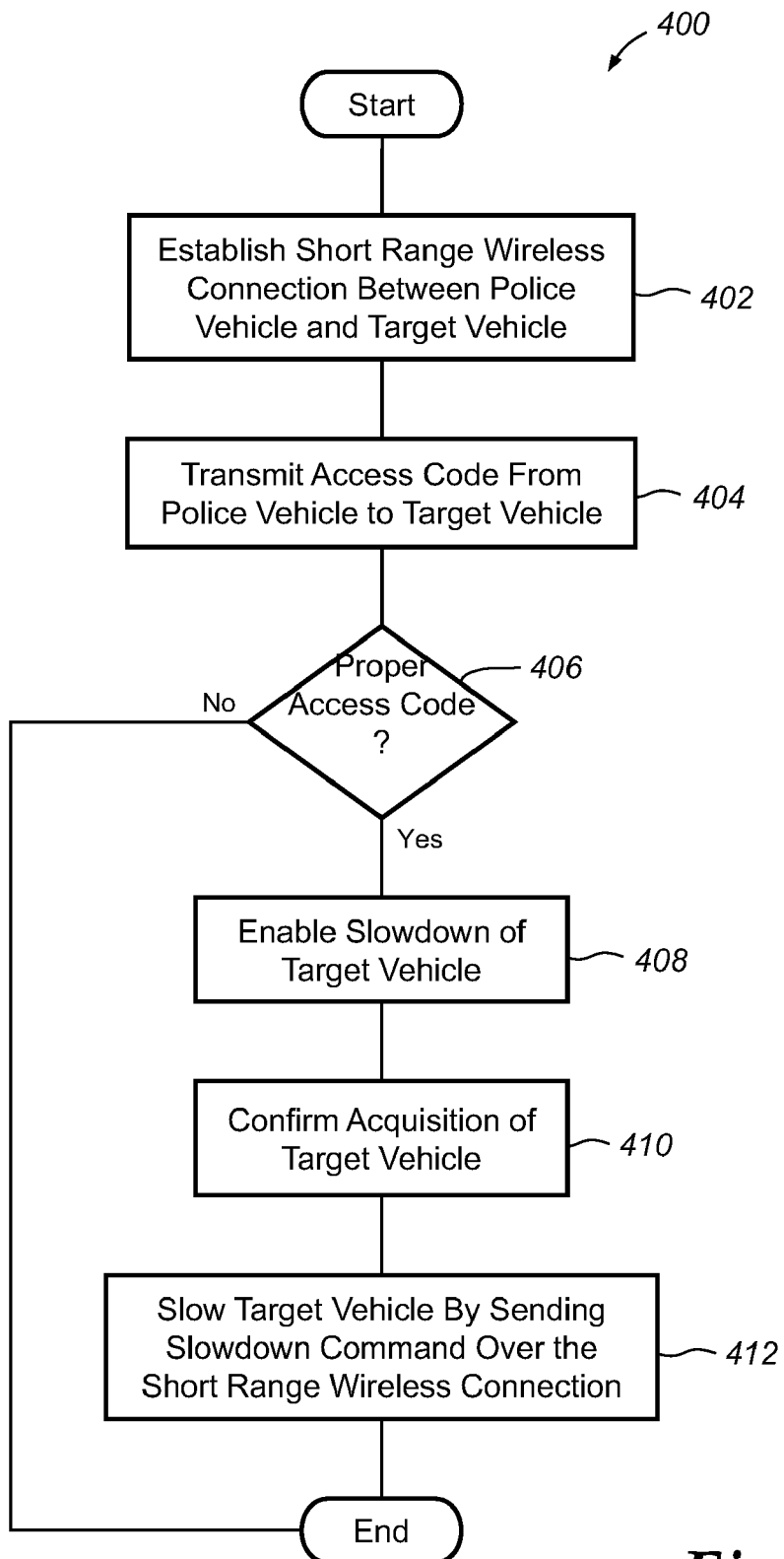
FIG. 4 is a flowchart showing another embodiment of the method of FIG. 1.

The specific methods described below in connection with FIGS. 2-4 are directed to different embodiments of a method for controlling a target vehicle from a police vehicle in pursuit of the target vehicle. The disclosed methods enable the police to slow the target vehicle down safely to a stop in a manner that (1) provides the pursuing officer with the ability to directly transmit the slowdown command to the target vehicle and (2) still enables the customer owning the vehicle to opt in or out of the slowdown service.

Communications System

Figure 1:
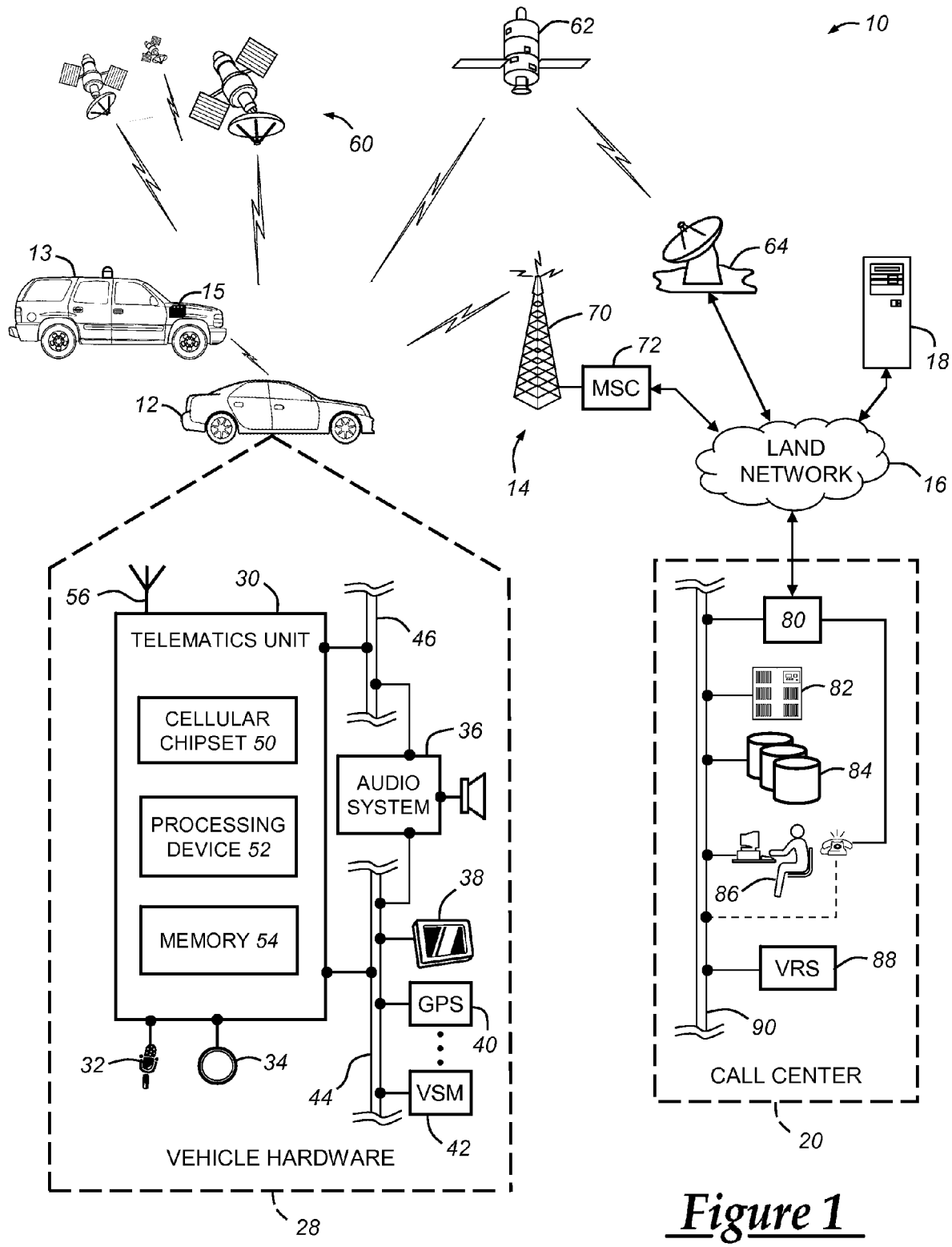
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the methods disclosed herein. Communications system 10 generally includes a target vehicle 12, police vehicle 13, one or more wireless carrier systems 14, a land communications network 16, a computer 18, and a call center 20. It should be understood that the disclosed methods can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicles 12 and 13 are depicted in the illustrated embodiment as passenger cars, but it should be appreciated that any other vehicle including motorcycles, trucks, sports utility vehicles (SUVs), recreational vehicles (RVs), marine vessels, aircraft, etc., can also be used. The police car 13 includes a telematics unit 15 that permits short range communication with vehicle 12. Police car 13 also includes other communication equipment (not shown) of the type commonly employed in police vehicles. For vehicle 12, some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Wireless communication between vehicle 12 and police vehicle 13 can be by any suitable short range wireless communication approach such as those noted above. For example, the two vehicles can be configured to connect via Bluetooth when they are within suitable range of each other. Alternatively, they could connect to each other via a nearby fixed wireless Internet connection or directly between each other using a packet-switched data protocol or other proprietary or non-proprietary approach.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used. Method Turning now to FIG. 2, there is shown a method 200 of controlling the vehicle 12 during police pursuit of the vehicle. The method starts at block 202 and begins with the target vehicle 12 being identified at the pursuing police vehicle 13. This can be done by an officer in the police vehicle visually spotting the target vehicle. This identification can involve reading the license plate to associate the plate number with a particular vehicle via a DMV lookup which the police officer can call in during the pursuit. At step 204 the target vehicle is configured to accept a slowdown command from the police vehicle. As will be discussed below in connection with the more specific embodiments of FIGS. 3 and 4, this configuration can be done during the pursuit after identification of the vehicle in step 202 and at any time before the slowdown command is sent, or it can be a pre-configuration of the vehicle such as before or after original delivery of the vehicle to the customer as part of enrollment or opting into a telematics service plan. In general, the actual configuration of the target vehicle can be accomplished by setting a trigger or flag within the vehicle telematics unit that tells the telematics unit to pass through to the powertrain control module a command to slow the vehicle to a stop when a slowdown command is received from the police vehicle 13. The use of such a trigger or flag enables the call center 20 to enable or disable the slowdown assistance function in accordance with the vehicle owner's wishes.

At step 206 the target vehicle is confirmed at the pursing police vehicle and this can be done in various ways, including by providing identifying target vehicle information to the call center for confirmation that the information matches the call center records. For example, the target vehicle's VIN can be obtained by the police using the vehicle's license plate as noted above, and this VIN can be forwarded to the call center to confirm that it exists in the call center's records. This can also be done to confirm that the target vehicle is authorized for slowdown assistance as a precursor to step 204.

Step 208 involves establishing a short range wireless connection between the police vehicle 13 and target vehicle 12. Various types of suitable short range wireless connections are noted above in connection with FIG. 1. Apart from using the call center to carry out the step 206 confirmation, it will be appreciated that target vehicle confirmation can also occur after step 208 such as by way of communication from the police vehicle to the target vehicle over the short range wireless connection. This approach is discussed in greater detail in conjunction with FIG. 4.

Finally, at step 210, the target vehicle is slowed, preferably to a stop, by sending the slowdown command from the police vehicle to the target vehicle over the short range wireless connection. The process then ends.

Turning now to FIG. 3, a more specific embodiment of the method of FIG. 2 will now be described. The method 300 begins at step 302 where the call center is contacted by the pursuing officer or other person on behalf of the police. There, the call center verifies that the customer has authorized use of the slowdown assistance services, step 304. This authorization can be obtained from the customer as a part of his or her enrollment in a particular telematics service plan provided by the call center, or can be a service that the customer opts into, or can be a default capability of the system that is provided unless the customer specifically opts out.

Once verification is complete, the method at step 306 provides the pursuing police vehicle with confirmation that the target vehicle is the vehicle designated to receive the slowdown command. This can be done as noted above by, for example, a VIN lookup based on license plate number which is then confirmed with call center records. Then, at step 308, the target vehicle is configured to accept the slowdown command. This can be by way of a cellular telephone call from the call center to the vehicle, with the call center then setting a trigger on the vehicle or otherwise configuring it to monitor for receipt of the slowdown command via the short range wireless connection. Finally, at step 310, when the slowdown command is received, either it is forwarded or an associated command is sent over the vehicle bus to the powertrain control module, which responds by slowing the vehicle to a stop regardless of the target vehicle operator's actions. The process then ends.

With reference to FIG. 4, there is provided a second embodiment of the generalized method of FIG. 2. In this embodiment, the method 400 can be used to allow police slowdown of the target vehicle without call center involvement, yet in a manner that still permits the call center to enable or disable the slowdown service when appropriate. The process begins at step 402 where the police vehicle establishes a short range wireless connection with the target vehicle. Then, at step 404, the police vehicle transmits over this connection an access code. This access code is used to help ensure that only authorized law enforcement personnel are able to initiate the vehicle slowdown. It can also be used for other purposes, such as to disable the service by changing the code to an unused code. Once the access code is received at the target vehicle, it is verified, step 406. If the code is not correct (e.g., does not match an authorization code stored on the target vehicle), then the process ends without slowdown.

If the access code is verified, then the slowdown function is enabled, as indicated at step 408, and the process then moves to step 410 where the police vehicle confirms that it has acquired (via the wireless connection and access code) the correct target vehicle. This can be done in a variety of different ways. For example, the target vehicle can be configured in response to verifying the access code, or in response to a separate command from the police vehicle, to provide a visual or other detectable signal or announcement that it is the vehicle connected wirelessly to the police vehicle for possible slowdown. As one example, the target vehicle can be configured to flash some or all of its exterior lights so that the pursuing officers can visually confirm that they are connected to the correct vehicle. Alternatively, or in addition, the target vehicle can be programmed to send its VIN to the police vehicle over the short range wireless connection. This VIN could be used by the police to lookup the vehicle information to confirm make and model, and this permits such an identification to be done without resort to the vehicle's license plate which may be missing, obscured, or not registered to that vehicle.

Once the police have received proper confirmation of the target vehicle, then they can at the appropriate time send the slowdown command to the target vehicle over the wireless connection such that the vehicle then slows to a stop. The process then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A method of controlling a vehicle during police pursuit of the vehicle, comprising the steps of:
    identifying a target vehicle at a police vehicle in pursuit of the target vehicle;
    configuring the target vehicle to accept a slowdown command;
    confirming the target vehicle at the police vehicle;
    establishing a short range wireless connection between the police vehicle and target vehicle, wherein successful establishment of the short range wireless connection between the police vehicle and target vehicle causes the target vehicle to visually confirm that it is in short range wireless communication with the police vehicle; and
    slowing the target vehicle by sending it the slowdown command from the police vehicle over the short range wireless connection.

2. The method of claim 1, wherein the identifying step further comprises the step of visually spotting the target vehicle by an occupant of the police vehicle.

3. The method of claim 1, wherein the configuring step further comprises the step of configuring the target vehicle to accept the slowdown signal in response to customer enrollment of the target vehicle into a telematics service plan.

4. The method of claim 1, wherein the configuring step further comprises the step of receiving at the target vehicle via a telephone call a control signal that enables the target vehicle to slow down in response to receipt of the slowdown command from the police vehicle.

5. The method of claim 1, wherein the configuring step further comprises the step of setting a trigger in the target vehicle that causes the target vehicle to slow down in response to receipt of the slowdown command from the police vehicle.

6. The method of claim 1, wherein the identifying and confirming steps together further comprise the steps of providing a call center with identifying information concerning the target vehicle and communicating information between the call center and police vehicle that confirms that the target vehicle is the vehicle designated to receive the slowdown command.

7. The method of claim 1, wherein the confirming and establishing steps together further comprise establishing the short range wireless connection between the police vehicle and target vehicle and then receiving vehicle data from the target vehicle that uniquely identifies the target vehicle.

8. The method of claim 1, wherein the establishing step further comprises the step of supplying an access code from the police vehicle to the target vehicle and, in response to receipt of the access code at the target vehicle, enabling the target vehicle to slow down in response to receipt of the slowdown command from the police vehicle.

9. The method of claim 1, wherein the slowing step further comprises slowing the vehicle down to a stop in response to receiving the slowdown command.

10. A method of controlling a vehicle during police pursuit of the vehicle, comprising the steps of:
    contacting a call center capable of wireless communication with a target vehicle;
    verifying customer authorization for slowdown of the target vehicle;
    providing a confirmation of the target vehicle by the call center to a police vehicle in pursuit of the target vehicle;
    configuring the target vehicle by the call center to accept a slowdown command; and
    slowing the target vehicle by sending it the slowdown command from the police vehicle over a short range wireless connection.

11. The method of claim 10, wherein the verifying step further comprises the step of verifying customer enrollment of the target vehicle into a telematics service plan.

12. The method of claim 10, wherein the configuring step further comprises the step of receiving at the target vehicle via a telephone call a control signal that enables the target vehicle to slow down in response to receipt of the slowdown command from the police vehicle.

13. The method of claim 10, wherein the configuring step further comprises the step of setting a trigger in the target vehicle that causes the target vehicle to slow down in response to receipt of the slowdown command from the police vehicle.

14. A method of controlling a vehicle during police pursuit of the vehicle, comprising the steps of:
    receiving, at a police vehicle, a customer-established access code that is used for control of a target vehicle during police pursuit;
    establishing a short range wireless connection between the police vehicle and the target vehicle;
    sending the customer-established access code to the target vehicle via the short range wireless connection;
    determining whether the customer-established access code permits control of the target vehicle; and, if so,
    slowing the target vehicle by sending it a slowdown command from the police vehicle over the short range wireless connection.

15. The method of claim 14, wherein the establishing step further comprises causing the target vehicle to visually confirm that it is in short range wireless communication with the police vehicle.

16. The method of claim 14, wherein the establishing step further comprises receiving vehicle data from the target vehicle that uniquely identifies the target vehicle.

17. A system for controlling a vehicle during police pursuit of the vehicle, comprising:

a target vehicle having a first wireless communication device that provides short range wireless communication capability, said first wireless communication device being programmed with executable code that permits a short range wireless connection to the vehicle, enables the target vehicle to visually confirm establishment of a short range wireless connection to the vehicle, and enables slowing of the target vehicle in response to receiving a slowdown command via the short range wireless connection; and a police vehicle having a second wireless communication device that provides short range wireless communication capability, said second wireless communication device being programmed with executable code that enables establishment of the short range wireless connection to the target vehicle, confirms the target vehicle via the short range wireless connection, and enables an occupant of the police vehicle to initiate transmission of the slowdown command from the police vehicle to the target vehicle over the short range wireless connection.

* * * * *